United States Patent
Hirakawa

(10) Patent No.: US 10,025,439 B2
(45) Date of Patent: Jul. 17, 2018

(54) VIRTUAL SENSOR MIRRORING FOR CIRCULAR TOUCH PANELS

(71) Applicant: Parade Technologies, Ltd., Santa Clara, CA (US)

(72) Inventor: Naoki Hirakawa, Hiroshima (JP)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 142 days.

(21) Appl. No.: 15/090,578

(22) Filed: Apr. 4, 2016

(65) Prior Publication Data

US 2016/0291737 A1    Oct. 6, 2016

Related U.S. Application Data

(60) Provisional application No. 62/142,451, filed on Apr. 2, 2015.

(51) Int. Cl.
*G06F 3/045*    (2006.01)
*G06F 3/044*    (2006.01)
*G06F 3/041*    (2006.01)

(52) U.S. Cl.
CPC ............ *G06F 3/044* (2013.01); *G06F 3/0416* (2013.01); *G06F 3/0418* (2013.01)

(58) Field of Classification Search
CPC ....... G06F 3/044; G06F 3/0418; G06F 3/0416
See application file for complete search history.

(56) References Cited

U.S. PATENT DOCUMENTS

| 8,294,687 B1 * | 10/2012 | Ksondzyk | G06F 3/0418 178/18.01 |
| 2012/0050209 A1 * | 3/2012 | King | G06F 3/0416 345/174 |
| 2014/0043251 A1 * | 2/2014 | Wilson | G06F 3/041 345/173 |
| 2016/0048246 A1 * | 2/2016 | Park | G06F 3/0416 345/173 |

* cited by examiner

*Primary Examiner* — Nelson Rosario
*Assistant Examiner* — Andrew Lee
(74) *Attorney, Agent, or Firm* — Morgan, Lewis & Bockius LLP

(57) ABSTRACT

A touch sensing system includes a capacitive sense array. Each sensor has a unique location type. The system includes a capacitance measurement circuit coupled to the array, which measures capacitance changes at each sensor. The system also includes a memory device that stores three or more adjustment parameters. Each parameter corresponds to one or more location types, and is used in computing virtual sensor values. The system receives measured capacitance changes corresponding to a touch on the array and identifies a first sensor whose measured capacitance change is a local maximum. The system determines a location type of the first sensor. According to the location type, the adjustment parameters corresponding to the location type, and the measured capacitance changes, the system computes virtual sensor measurements. The system then computes a centroid of the touch using the measured capacitance changes and the virtual sensor measurements.

15 Claims, 17 Drawing Sheets

Figure 4

| Corner | OuterEdge | OuterEdge | OuterEdge | OuterEdge | Corner |
|---|---|---|---|---|---|
| OuterEdge | InnerEdge | InnerEdge | InnerEdge | InnerEdge | OuterEdge |
| OuterEdge | InnerEdge | Core | Core | InnerEdge | OuterEdge |
| OuterEdge | InnerEdge | Core | Core | InnerEdge | OuterEdge |
| OuterEdge | InnerEdge | InnerEdge | InnerEdge | InnerEdge | OuterEdge |
| Corner | OuterEdge | OuterEdge | OuterEdge | OuterEdge | Corner |

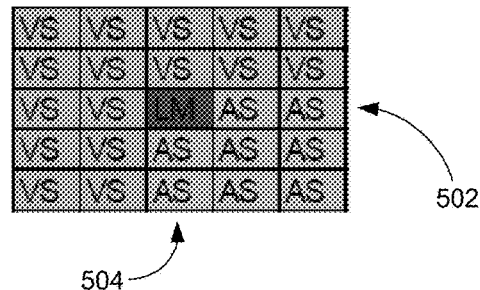

Figure 5A (LM at corner)

Figure 5B (LM at outer edge)

Figure 5C (LM at outer edge)

Figure 5D (LM at inner edge)

Figure 5E (LM at inner edge)

Outer Edge Calculation

VS — Unpopulated
VS — Populated

Figure 7C

Inner Edge
Calculation

| VS | Unpopulated |
| VS | Populated |

Figure 9

|  | Corner | OuterEdge | OuterEdge | Corner |  |
|---|---|---|---|---|---|
| Corner | InnerCorner | InnerEdge | InnerEdge | InnerCorner | Corner |
| OuterEdge | InnerEdge | Core | Core | InnerEdge | OuterEdge |
| OuterEdge | InnerEdge | Core | Core | InnerEdge | OuterEdge |
| Corner | InnerCorner | InnerEdge | InnerEdge | InnerCorner | Corner |
|  | Corner | OuterEdge | OuterEdge | Corner |  |

Figure 10A

| Parameter Name | Description |
|---|---|
| Inner Edge Gain | Gain of virtual sensors adjacent to actual sensors |
| Outer Edge Gain | Gain of virtual sensors adjacent to virtual sensors generated by Inner Edge Gain |
| Edge Corner Gain | Both inner edge and outer edge includes virtual corner to be generated. This gain is used to generate its corner. |
| Corner Gain | Gain to generate virtual corner sensor on the location of "Corner". |
| Inner Corner Gain | Gain to generate virtual inner corner on the location of "Inner Corner". |
| Outer Corner Gain | Gain to generate virtual outer corner on the location of "Inner Corner". |

Figure 10B

| Parameter | Location |  |  |  |  |
|---|---|---|---|---|---|
|  | Core | InnerEdge | OuterEdge | Corner | InnerCorner |
| Inner Edge Gain |  | X | X | X | X |
| Outer Edge Gain |  |  | X | X |  |
| Edge Corner Gain |  | X | X |  |  |
| Corner Gain |  |  |  | X |  |
| Inner Corner Gain |  |  |  |  | X |
| Outer Corner Gain |  |  |  |  | X |

Inner Edge Examples (1) LocalMax(1,2)

| VS | VS | AS | AS | AS |
|----|----|----|----|----|
| VS | AS | AS | AS | AS |
| VS | AS | LM | AS | AS |
| VS | AS | AS | AS | AS |
| VS | AS | AS | AS | AS |

← 1100

(2) LocalMax(1,3)

| VS | AS | AS | AS | AS |
|----|----|----|----|----|
| VS | AS | AS | AS | AS |
| VS | AS | LM | AS | AS |
| VS | AS | AS | AS | AS |
| VS | VS | AS | AS | AS |

(3) LocalMax(2,2)

| VS | VS | VS | VS | VS |
|----|----|----|----|----|
| VS | AS | AS | AS | AS |
| AS | AS | LM | AS | AS |
| AS | AS | AS | AS | AS |
| AS | AS | AS | AS | AS |

(4) LocalMax(2,3)

| AS | AS | AS | AS | AS |
|----|----|----|----|----|
| AS | AS | AS | AS | AS |
| AS | AS | LM | AS | AS |
| VS | AS | AS | AS | AS |
| VS | VS | VS | VS | VS |

(5) LocalMax(3,2)

| VS | VS | VS | VS | VS |
|----|----|----|----|----|
| AS | AS | AS | AS | VS |
| AS | AS | LM | AS | AS |
| AS | AS | AS | AS | AS |
| AS | AS | AS | AS | AS |

(6) LocalMax(3,3)

| AS | AS | AS | AS | AS |
|----|----|----|----|----|
| AS | AS | AS | AS | AS |
| AS | AS | LM | AS | AS |
| AS | AS | AS | AS | VS |
| VS | VS | VS | VS | VS |

(7) LocalMax(4,2)

| AS | AS | AS | VS | VS |
|----|----|----|----|----|
| AS | AS | AS | AS | VS |
| AS | AS | LM | AS | VS |
| AS | AS | AS | AS | VS |
| AS | AS | AS | AS | VS |

(8) LocalMax(4,3)

| AS | AS | AS | AS | VS |
|----|----|----|----|----|
| AS | AS | AS | AS | VS |
| AS | AS | LM | AS | VS |
| AS | AS | AS | AS | VS |
| AS | AS | AS | VS | VS |

Figure 11A

Revised
Inner Edge
Calculation

Unpopulated VS
Populated VS

Figure 11D

Unpopulated VS
Populated VS

Outer Edge Examples (1) LocalMax(0,2)

(2) LocalMax(0,3)

(3) LocalMax(2,0)

(4) LocalMax(2,5,)

(5) LocalMax(3,0)

(6) LocalMax(3,5)

(7) LocalMax(5,2)

(8) LocalMax(5,3)

Figure 12A

Revised Outer Edge Calculation
Figure 12B
Figure 12C
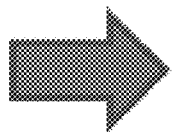
Figure 12D
1202
1204

Corner Examples (1) LocalMax(0,1)  (1) LocalMax(4,0)

(2) LocalMax(0,4)  (1) LocalMax(4,5)

(1) LocalMax(1,0)  (1) LocalMax(5,1)

(1) LocalMax(1,5)  (1) LocalMax(5,4)

Figure 13A

Revised Corner Calculation

Unpopulated VS
Populated VS

Figure 13D

Unpopulated VS
Populated VS

Figure 13E

Unpopulated VS
Populated VS

Figure 13F

Unpopulated VS
Populated VS

Inner Corner Examples (1) LocalMax(1,1)

(2) LocalMax(1,4)

(3) LocalMax(4,1)

(4) LocalMax(4,4)

Figure 14A

Figure 14B — Inner Corner Calculation
Figure 14C
Figure 14D
Figure 14E
Figure 14F

VIRTUAL SENSOR MIRRORING FOR CIRCULAR TOUCH PANELS

RELATED APPLICATIONS

This application claims priority to U.S. Provisional Application Ser. No. 62/142,451, filed Apr. 2, 2015, entitled "Virtual Sensor Mirroring Method for Circular Panel," which is incorporated by reference herein in its entirety.

TECHNICAL FIELD

The disclosed implementations relate generally to touch-sensitive displays, and in particular, to computing touch centroids for touches on a non-rectangular touch-sensitive display.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device.

One type of user interface device that has become more common operates by way of capacitance sensing. A capacitance sensing system may include a touch screen, a touch-sensor pad, a touch-sensor slider, or touch-sensor buttons, and may include an array of one or more capacitive sensor elements (also referred to as sensor electrodes). Capacitive sensing typically involves measuring, through sensor signals (e.g., increases or decreases in electrode responses), a change in capacitance associated with the capacitive sensor elements to determine a presence of a conductive object (e.g., a user's finger or a stylus) relative to the capacitive sensor elements.

Changes in capacitance are measured across arrays of sensors when they are used for sensing and processing capacitive touch applications. Because the "changes" are measured, changing information (AC or delta information) is desired in order to detect variation in capacitance, while constant information (DC or signal offset) is not desired. The DC component is rejected.

A touch on a touch sensitive display typically spans multiple sensors to varying degrees. Various algorithms are used to identify the "location" of the touch based on the multiple sensor readings. Some algorithms identify a sensor whose capacitance change is a local maximum. Some techniques construct a centroid for the touch, and may use a local maximum to identify a small region for analysis (e.g., a 3×3 or 5×5 grid around the local maximum).

When a touch is towards the middle of the array, there are actual sensors ("AS") around the identified local maximum. However, at or near the edge of the array, there are not actual sensors to fill out the local region. Some systems compute virtual sensor ("VS") measurements to extend the array of actual sensors.

Known techniques of computing virtual sensors do not work well when the touch sensor array is non-rectangular. In particular, conventional centroid algorithms were designed for rectangular sensor patterns and do not fit circular sensor patterns, which are often used for wearable products.

SUMMARY

Disclosed implementations of systems, methods, and devices address the problems associated with computing touch centroids for touches near the edge of a touch sensor array. In particular, the techniques disclosed can be applied to circular or other non-rectangular arrays of touch sensors.

According to some implementations, a touch sensing system includes a two-dimensional capacitive sense array. The capacitive sense array includes a plurality of capacitive sensors, which are typically arranged in a rectangular shape. In some implementations, the two-dimensional array is non-rectangular (e.g., circular). Each capacitive sensor in the capacitive sense array is associated with a unique location type. In some implementations, the location types are core, inner edge, outer edge, outer corner, and inner corner.

The touch sensing system includes a capacitance measurement circuit coupled to the capacitive sense array. The capacitance measurement circuit is configured to measure capacitance changes at each capacitive sensor of the capacitive sense array. The touch sensing system also includes a memory device that stores three or more adjustment parameters. Each adjustment parameter corresponds to one or more of the location types, and is used in computing virtual sensor values.

The touch sensing system also includes a processing unit coupled to the capacitance measurement circuit. The processing unit is configured to receive measured capacitance changes corresponding to a touch on the capacitive sense array and to identify a first capacitive sensor whose measured capacitance change is a local maximum within the capacitance sense array. The processing unit determines a first location type of the first sensor. In accordance with the first location type, the adjustment parameters corresponding to the first location type, and the measured capacitance changes, the processing unit computes a plurality of virtual sensor measurements. The processing unit then computes a centroid of the touch using a plurality of the measured capacitance changes and the plurality of virtual sensor measurements.

In some implementations, the adjustment parameters include a first adjustment parameter for inner edges, a second adjustment parameter for outer edges, and a plurality of additional adjustment parameters for corners. In some of these implementations, the plurality of additional adjustment parameters for corners include an inner corner adjustment parameter, an outer corner adjustment parameter, an edge corner adjustment parameter, and a corner adjustment parameter.

In some implementations, a method is performed at a touch sensing system that includes a capacitive sense array and one or more processing devices coupled to the capacitive sense array. The processing devices are configured to perform any of the methods described herein.

In some implementations, a non-transitory computer-readable storage medium stores one or more programs configured for execution by one or more processors of a touch sensing system. The one or more programs include instructions for performing any of the methods described herein.

The disclosed techniques increase both the accuracy and linearity of touch calculations.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures.

FIG. 4 illustrates location types for sensors in a rectangular array in accordance with some implementations.

FIGS. 5A-5E illustrate a local maximum ("LM") capacitance measurement at various locations within a rectangular array, in accordance with some implementations.

FIGS. 7A-7C illustrate a process for calculating virtual sensor measurements at an outer edge of a rectangular array, in accordance with some implementations.

FIG. 9 illustrates location types for sensors in a non-rectangular array in accordance with some implementations.

FIGS. 10A and 10B provide tables of parameters that are used in calculating virtual sensor measurements in accordance with some implementations.

FIGS. 11A-11D illustrate a process for calculating virtual sensor measurements at an inner edge of a non-rectangular array, in accordance with some implementations.

FIGS. 12A-12D illustrate a process for calculating virtual sensor measurements at an outer edge of a non-rectangular array, in accordance with some implementations.

FIGS. 13A-13F illustrate a process for calculating virtual sensor measurements at a corner (also referred to as an outer corner) of a non-rectangular array, in accordance with some implementations.

FIGS. 14A-14F illustrate a process for calculating virtual sensor measurements at an inner corner of a non-rectangular array, in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DETAILED DESCRIPTION

The various implementations described herein include systems, methods and/or devices used to compute centroids for touchscreen proximity sensing. Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

Figure 1:
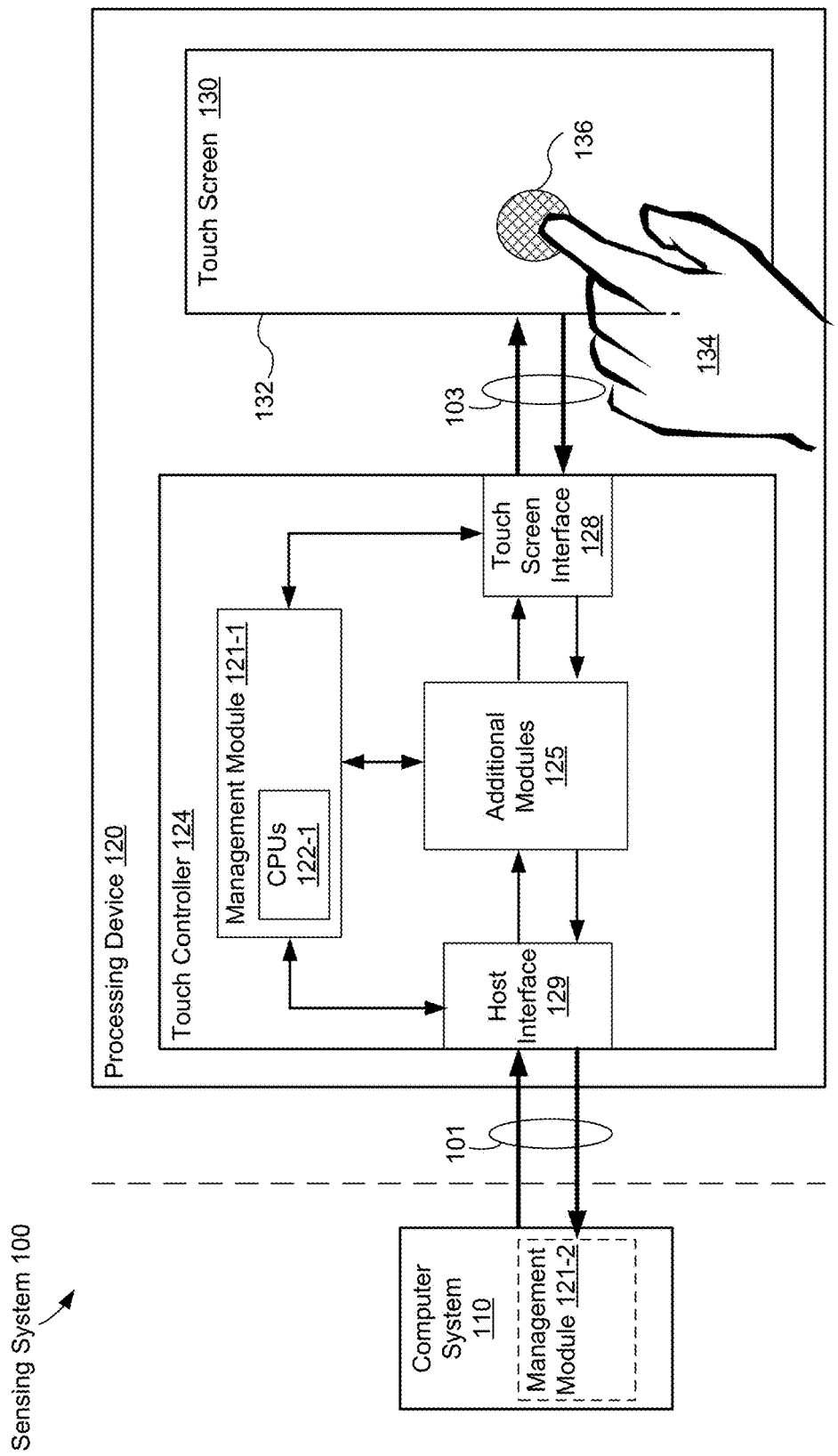
FIG. 1 is a block diagram illustrating a sensing system, in accordance with various implementations.

FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, sensing system 100 includes a processing device 120 (also sometimes called a touch sensitive device), which includes a touch controller 124 and a touch screen 130 (also sometimes called a touch sensitive display), and is used in conjunction with or includes a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provides some other functionality based on a detection of a user input. In some implementations, the touch screen provides the functionality of a proximity sensor.

The computer system 110 is coupled to the touch controller 124 through data connections 101. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110.

The touch screen 130 is coupled to the touch controller 124 through the connections 103. In some implementations, however, the touch controller 124 and the touch screen 130 are included in the same device (i.e., an integrated electronic device) as components thereof. Furthermore, in some implementations, the touch controller 124 and the touch screen 130 are embedded in a host device (e.g., computer system 110), such as a mobile device, tablet, other computer or computer controlled device, and the methods described herein are performed, at least in part, by the embedded the touch controller. The touch screen 130 includes a sensing array 132 (e.g., a capacitive sense array) that forms a touch sensitive display. In some implementations, the sensing array 132 includes one or more of light-sensitive elements, light emitting elements, photosensitive elements, pressure sensitive elements, and/or capacitive sensor elements (also referred to as sensor electrodes). The capacitive sensor elements are electrodes of conductive material, such as copper. The sensing array 132 is sensitive to an input object 134 at a location 136 (e.g., a user's finger).

In some implementations, a touch controller 124 includes a management module 121-1, a host interface 129, a touch screen interface 128, and additional module(s) 125. The touch controller 124 may include various additional features that have not been illustrated for the sake of brevity and so as not to obscure pertinent features of the example implementations disclosed herein, and a different arrangement of features may be possible. The host interface 129 provides an interface to the computer system 110 through the data connections 101. Similarly, the touch screen interface 128 provides an interface to the touch screen 130 though the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like) configured to detect (or process), via the sensing array 132, a presence of one or more input objects 134 proximate or in contact with one or more sensor electrodes of the sensing array 132. In some implementations, the management module 121-1 performs operations (e.g., scan operations) to sense, via the sensing array 132, signals indicating the presence of the one or more input objects (e.g., input object 134). In some implementations, the management module 121-1 detects a pressure applied to the touch screen 130, light (e.g., infrared light) associated with an input object, an image associated with an input object, a capacitance of the sensors and/or a change in capacitance of one or more of the sensor electrodes of the sensing array 132 when an input object is proximate to or in contact with the touch screen 130. The sensing ability of the sensing module 121-1 depends on the type of sensors used in the touch screen 130 (e.g., capacitance sensors such as self-capacitance sensors and/or mutual-capacitance sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch screen interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch screen interface 128, the host interface 129, and the management module 121-1. As an example, the additional module(s) 125 may include a memory module (e.g., random access memory and/or flash memory). In some implementations, the memory module stores detected electrode responses, electrode response criteria, previously determined baselines, and the like. In some implementations, the additional module(s) 125 include analog and/or digital general purpose input/output ("GPIO") ports 107. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems) using, in one implementation, configurable user modules ("Ums"). In some implementations, the additional module(s) 125 include an analog block array that is used to implement a variety of analog circuits. The analog block array may also be coupled to the GPIO ports.

Figure 2:
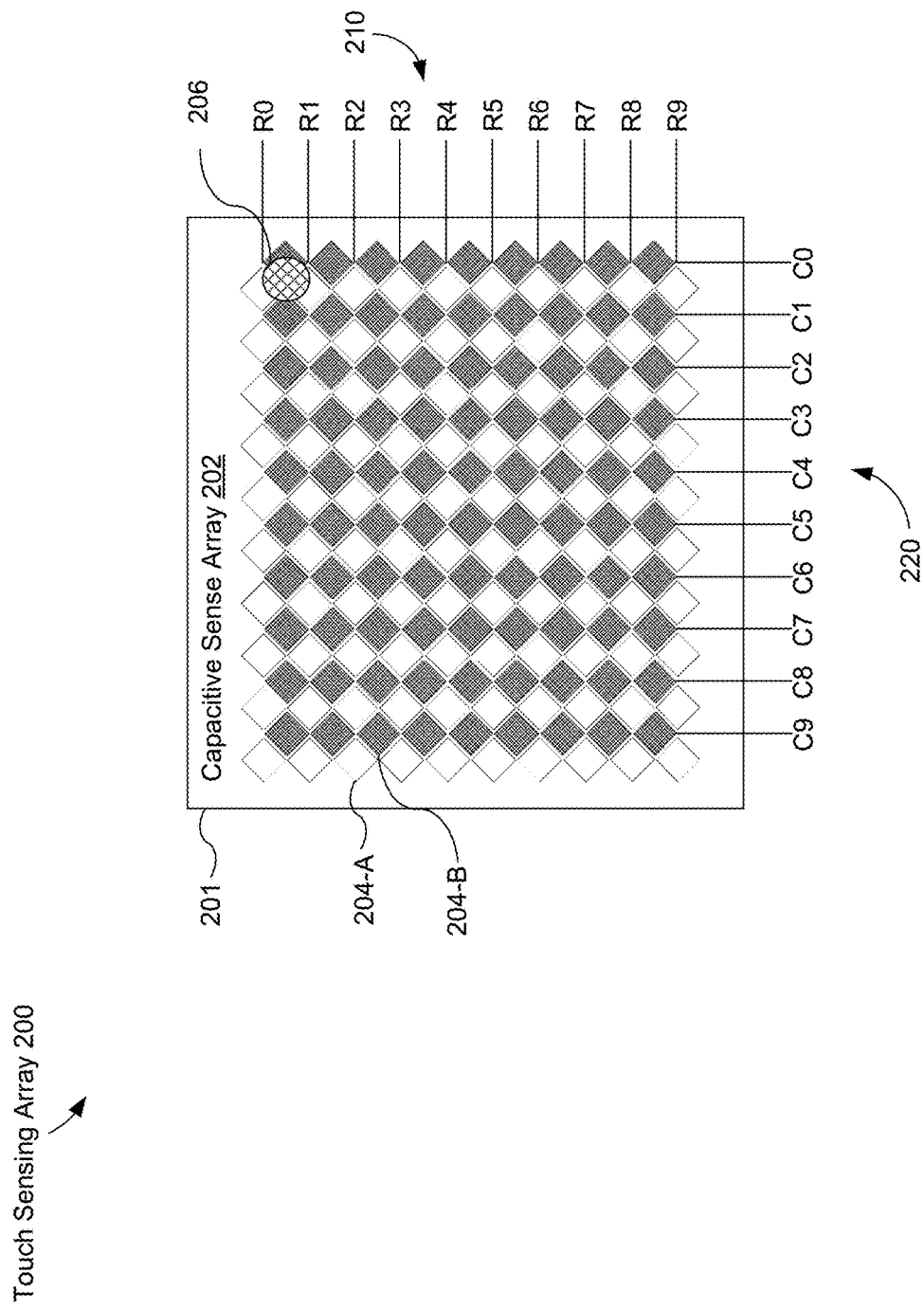
FIG. 2 is a diagram illustrating a touch sensing array including a substrate having a capacitive sense array (e.g., a touch screen), in accordance with various implementations.

FIG. 2 is a diagram illustrating a touch sensing array 200 (e.g., the touch screen 130 in FIG. 1) including a substrate 201 (e.g., a dielectric material) having a capacitive sense array 202 (e.g., the sensing array 132 in FIG. 1), in accordance with various implementations. As shown, FIG. 2 includes rows R0-R9 210 and columns C0-C9 220 of sensor elements (e.g., sensor elements 204-A, 204-B) arranged in an array. The rows R0-R9 210 and the columns C0-C9 220 of sensor elements are coupled with a sensing module (e.g., a management module 121-1). In the operations described in more detail below, each of the rows R0-R9 210 and columns C0-C9 220 of sensor elements may operate as both transmit and receive electrodes.

In some implementations, the plurality of sensor electrodes 204 includes both self-capacitance sensors and mutual-capacitance sensors. Within the capacitive sense array 202, each of the rows R0-R9 210 of the sensor elements 204 crosses with each of the columns C0-C9 220 of the sensor elements 204. In this way, galvanic isolation is maintained between the rows R0-R9 210 and the columns C0-C9 220. In some implementations, each of the columns C0-C9 220 are associated with an X-coordinate or range of X-coordinates of the X-Y plane and each of the rows R0-R9 210 are associated with a Y-coordinate or range of Y-coordinates of the X-Y plane. In this way, the sensing module can determine a location (e.g., the touch location 136 in FIG. 1) of a touch 206 on the capacitive sense array 202 using X and Y coordinates of the touch 206.

It should be understood that although the plurality of sensor electrodes 204 are shown to be diamond shaped, one or more of the sensor elements 204 may be formed of other shapes (e.g., lines, stripes, bars, triangles, snowflakes, and/or any other shape) and be organized in various other patterns (e.g., intersections, concentric circles, saw tooth pattern, Manhattan pattern, and/or other patterns) without departing from the claimed subject matter. In some implementations, the sensor elements 204 cover all or a portion of the surface area of the substrate 201. In some implementations, the sensor elements 204 and patterns of the sensor elements 204 are formed on or through one or more layers on the substrate 201.

In some implementations, a processing device (or one or more components of the processing device) measures capacitance of the plurality of sensor electrodes 204 using self-capacitance sensing. In some implementations, self-capacitance sensing measures added (or subtracted) capacitance at each of the plurality of sensor electrodes 204. For example, a user's touch (e.g., a finger) at a specific sensor electrode increases capacitance at the specific sensor electrode because the finger's capacitance is added to the capacitance of the specific sensor electrode. The processing device detects a "touch" when the added capacitance to the specific sensor electrode, relative to a baseline, exceeds a predefined threshold.

In some implementations, the processing device measures capacitance of the plurality of sensor electrodes 204 using mutual-capacitance sensing. In some implementations, mutual-capacitance sensing measures capacitance between a column electrode (e.g., a transmitter (TX) electrode), and a row electrode (e.g., a receiver (RX) electrode). For example, mutual-capacitance sensing measures a change (e.g., a decrease or increase) in capacitance between the column electrode and the row electrode resulting from a user's touch.

Figure 3:
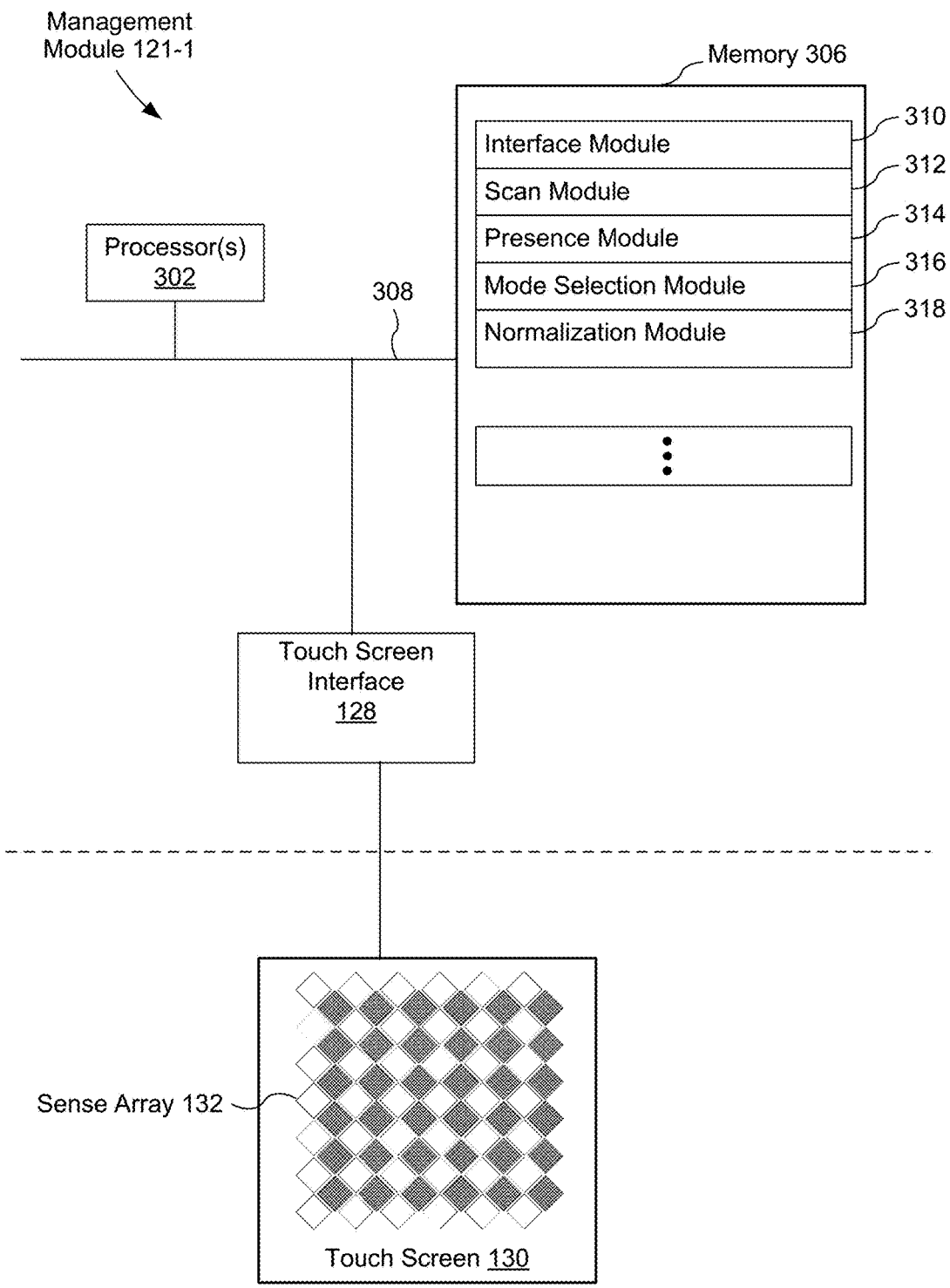
FIG. 3 is a block diagram illustrating an implementation of a management module.

FIG. 3 is a block diagram illustrating an implementation of a management module. The management module 121-1 typically includes one or more processing units 302 for executing modules, programs, and/or instructions stored in memory 306 and thereby performing processing operations, memory 306 and one or more communication buses 308 for interconnecting these components. The communication buses 308 optionally include circuitry (sometimes called a chipset) that interconnects and controls communications between system components. In some implementations, the management module 121-1 is coupled to a touch screen by the communication buses 308 and the touch screen interface 128. In some implementations, the memory 306, or the computer readable storage medium of the memory 306 stores the following modules and data used by the modules:

- an interface module 310 that is used for communicating with other components of the electronic device.
- a scan module 312 that is used to convert sensor signals (e.g., convert analog signals, such as voltage and/or change, into digital signals, or vice versa);
- a presence module 314 that is used to detect presence of a conductive object (e.g., a user's finger), or lack of a conductive object;
- a mode selection module 316 that is used to select a mode of operation of the electronic device based on electrode responses from the capacitive sense array; and
- a normalization module 318 that is used to normalize electrode responses from the capacitive sense array (i.e., establish a new baseline).

In some implementations, the scan module 312 uses a multiplexer or switch matrix (not shown) to distribute signals to one or more sensor electrodes. In some implementations, the scan module 312 uses the same or a different multiplexer (not shown) to receive current from the one or more sensor electrodes. This configuration allows the scan module 312 to scan all or specific portions of the capacitive sense array. In some implementations, scanning specific portions of the capacitive sense array (e.g., corner portions) consumes less energy compared to scanning the entire capacitive sensor array.

Each of the above identified elements may be stored in one or more of the previously mentioned memory devices that together form the memory 306, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 306 may store a subset of the modules and data structures identified above. Furthermore, the memory 306 may store additional modules and data structures not described above. For example, in some implementations, the memory 306 stores detected electrode responses, electrode response criterions, previously determined baselines, the water detection algorithm, the wipe detection algorithm, and other relevant information. In some implementations, the programs, modules, and data structures stored in memory 306, or the computer readable storage medium of the memory 306, provide instructions for implementing respective operations in the methods described herein.

FIG. 4 illustrates location types for sensors in a rectangular array in accordance with some implementations. In this example, the central sensors are labeled as "core." These are the sensors that are at least two sensors away from any edge. There are four "corners" and four rows/columns of outer edge sensors. In addition, there is a rectangular ring of "inner edge" sensors that are adjacent to the outer edge.

The calculation of a centroid for a touch depends on whether the finger location is at a Corner, an OuterEdge, an InnerEdge, or the Core area. For the core area, it is reasonably easy to compute a centroid because there are enough surrounding sensor readings. To report reasonable edge/corner coordinates at other locations, implementations use a virtual sensor mirroring technique.

To illustrate the calculations, various grids of sensors are shown using two-character codes to identify each position. "VS" is used to represent a Virtual Sensor, "LM" is used to identify a Local Maximum (where the finger is located), and "AS" is used to identify an Actual Sensor. Note that an LM sensor is a special case of an actual sensor AS.

FIGS. 5A-5E illustrate a local maximum ("LM") capacitance measurement at various locations within a rectangular array, in accordance with some implementations. FIG. 5A illustrates the local maximum at a corner of outer edges 502 and 504, FIG. 5B illustrates the local maximum on an outer edge 506, FIG. 5C illustrates the local maximum on a outer edge 508, FIG. 5D illustrates the local maximum on an inner edge 510, and FIG. 5E illustrates the local maximum on an inner edge 512.

FIGS. 6A-6E illustrate a process for calculating virtual sensor measurements at a corner of a rectangular array, in accordance with some implementations. The local maximum LM is at the center of a 5×5 grid, which includes both virtual sensors and actual sensors.

Figures 6A, 6B, 6C, 6D, 6E:
FIGS. 6A-6E illustrate a process for calculating virtual sensor ("VS") measurements at a corner of a rectangular array, in accordance with some implementations.

As illustrated in FIG. 6A, the rows and columns are labeled 0-4 in the grid, and each element is referenced by [row, column]. For example, the bottom left virtual sensor in FIG. 6A is VS[4,0]. The sequence of FIGS. 6A-6E illustrates one way to populate the values of the virtual sensors in sequence.

As illustrated in FIG. 6B, virtual sensors that are adjacent to actual sensors are computed using a first adjustment parameter, which is sometimes referred to as the Inner Edge Gain. Virtual sensors VS[1,2], VS[1,3], VS[1,4] are populated here, which can be expressed in shorthand as For (j=2; j<5; j++):

$$VS[1, j] = \frac{AS[2, j] * \text{Inner Edge Gain}}{128}$$

Note that AS[2,2] is equivalent to LM. Next, populate VS[2,1], VS[3,1], VS[4,1], which is For (i=2; i<5; i++):

$$VS[i, 1] = \frac{AS[i, 1] * \text{Inner Edge Gain}}{128}$$

The denominator is shown as 128, but this is just an example. FIG. 6C illustrates that the next calculation is for V[1,1]. Specifically, $$VS[1, 1] = \frac{VS[1, 2] + VS[2, 1]}{2}$$

Now that the inner edge values are computed, the process proceeds to compute the outer edge values, using a second adjustment parameter (Outer Edge Gain). In particular, this populates VS[0,1] to VS[0,4], which is expressed as For (j=1; j<5; j++):

$$VS[0, j] = \frac{VS[0, j] * OuterEdgeGain}{128}$$

Similarly, the process populates VS[1,0] to VS[4,0], which can be expressed as For (i=1; i<5; i++)

$$VS[i, 0] = \frac{LM[i, 1] * \text{Outer Edge Gain}}{128}$$

These calculations produce an array as illustrated in FIG. 6D. The only missing calculation is the upper left virtual sensor VS[0,0]. This element is computed using the formula $$VS[0, 0] = \frac{VS[1, 0] + VS[0, 1]}{2}$$

After this final calculation, the grid appears as shown in FIG. 6E.

FIGS. 7A-7C illustrate a process for calculating virtual sensor measurements at an outer edge of a rectangular array, in accordance with some implementations. The first step is to compute the values in row 1 of FIG. 7A. That is, For (j=0; j<5; j++), VS[1,0] to VS[1,4] are populated using AS[2,0] to AS[2,4] with Inner Edge Gain as shown in the formula $$VS[1, j] = \frac{AS[2, j] * \text{Inner Edge Gain}}{128}$$

This results in computed virtual sensors as illustrated in FIG. 7B. Next, the process populates VS[0,0] to VS[0,4] using the previously computed values for VS[1,0] to [1,4] with Outer Edge Gain. In particular, For (j=0; j<5; j++), the process computes:

$$VS[0, j] = \frac{VS[1, j] * \text{Outer Edge Gain}}{128}$$

This results in computing all of the virtual sensor values, as illustrated in FIG. 7C.

Figures 8A, 8B:
FIGS. 8A and 8B illustrate a process for calculating virtual sensor measurements at an inner edge of a rectangular array, in accordance with some implementations.

FIGS. 8A and 8B illustrate a process for calculating virtual sensor measurements at an inner edge of a rectangular array, in accordance with some implementations. For an inner edge there is a single processing step that leads from the original grid in FIG. 8A to final grid in FIG. 8B. In this case, VS[0,0] to VS[0,4] are populated using AS[1,0] to AS[1,4] with Inner Edge Gain, For (j=0; j<5; j++):

$$VS[0, j] = \frac{AS[1, j] * \text{Inner Edge Gain}}{128}$$

As illustrated in these examples, for a rectangular array, there are only three distinct location types that use virtual sensor values for computing a centroid, and the calculations use only two adjustment parameters (Inner Edge Gain and Outer Edge Gain). For a non-rectangular array, there are more location types and more adjustment parameters to account for the sensor arrangements.

FIG. 9 illustrates location types for sensors in a non-rectangular array in accordance with some implementations. In this example, there are five types of touch locations: Corner (sometimes referred to as an "Outer Corner"), Inner-Corner, OuterEdge, InnerEdge, and Core. As with a rectangular array, the Core sensors have at least two actual sensors on all sides, so no virtual sensors are needed in order to compute a centroid using a 5×5 grid. For the other location types, various virtual sensor measurement are computed, including:

Inner Edge: virtual sensors for 1 row (or column) and 1 corner are generated.

Outer Edge: virtual sensors for 2 rows (or columns) and 1 corner are generated.

Corner: virtual sensors for 1 row (or column), 2 columns (or rows), and 1 corner are generated.

Inner Corner: virtual sensors for 1 row (or column), 1 column (or row), and 2 corners are generated.

Some implementations compute these virtual sensor values using the six adjustment parameters listed in FIG. 10A, including Inner Edge Gain, Outer Edge Gain, Edge Corner Gain, Corner Gain, Inner Corner Gain, and Outer Corner Gain. These parameters are used depending on the location of the local maximum LM and the location of the virtual sensor relative to the other sensors, as illustrated in FIG. 10B. The table in FIG. 10B indicates which adjustment parameters are used depending on the location of the sensor, and this is described in more detail below in FIGS. 11A-11D, 12A-12D, 13A-13F, and 14A-14F.

FIGS. 11A-11D illustrate a process for calculating virtual sensor measurements at an inner edge of a non-rectangular array, in accordance with some implementations. FIG. 11A illustrates 8 different arrangements that have an inner edge sensor as the local maximum LM. Based on horizontal, vertical, and/or diagonal mirroring, each of the arrangements is equivalent to the first arrangement 1100, which is described in FIGS. 11B-11D.

FIG. 11B illustrates the starting point, with 6 virtual sensors not yet calculated. The first sensor to calculate is the virtual sensor VS[0,1], which in some implementations is computed as:

$$VS[0, 1] = \frac{AS[1, 1] + AS[0, 2]}{2} * \frac{EdgeCornerGain}{32}$$

Computing this virtual corner at [0,1] produces the grid as shown in FIG. 11C. The next process is to compute the values for the virtual sensors VS[0,0] to VS[4,0] using the data from virtual sensor VS[0,1] and actual sensors AS[1,1] to AS[4,1]. If we define AS[0,1] to be the same as VS[0,1], then we can express all of these using the formula $$VS[i, 0] = AS[i, 1] * \frac{InnerEdgeGain}{128}$$

where i ranges from 0 to 4.

FIGS. 12A-12D illustrate a process for calculating virtual sensor measurements at an outer edge of a non-rectangular array, in accordance with some implementations. FIG. 12A illustrates 8 different arrangements that have an outer edge sensor as the local maximum LM. Based on horizontal, vertical, and/or diagonal mirroring, each of the arrangements is equivalent to the first arrangement 1200, which is described in FIGS. 12B-12D.

FIG. 12B illustrates the starting point, with 11 virtual sensors not yet calculated. The first sensor to calculate is the virtual sensor VS[0,2], which in some implementations is computed as:

$$VS[0, 2] = \frac{AS[1, 2] + AS[0, 3]}{2} * \frac{EdgeCornerGain}{32}$$

This results in the grid shown in FIG. 12C when the virtual corner VS[0,2] is populated. The next step is to compute the virtual sensor values VS[0,1] to VS[4,1] as illustrated by the grid 1202 in FIG. 12D. In some implementations, these values are computed using the formula $$VS[i, 1] = AS[i, 2] * \frac{InnerEdgeGain}{128}$$

for i=0 to 4. Finally, the virtual sensors VS[0,0] to VS[4,0] are computed, as illustrated by the grid 1204 in FIG. 12D. In some implementations, the values are computed using the formula $$VS[i, 0] = VS[i, 1] * \frac{OuterEdgeGain}{128}$$

FIGS. 13A-13F illustrate a process for calculating virtual sensor measurements at a corner (also referred to as an outer corner) of a non-rectangular array, in accordance with some implementations. FIG. 13A illustrates 8 different arrangements that have an corner sensor as the local maximum LM. Based on horizontal, vertical, and/or diagonal mirroring, each of the arrangements is equivalent to the first arrangement 1300, which is described in FIGS. 13B-13F.

FIG. 13B illustrates the starting point, with 14 virtual sensors not yet calculated. The first sensor to calculate is the virtual corner sensor VS[1,2], which in some implementations is computed as $$VS[1, 2] = \frac{AS[2, 2] + AS[1, 3]}{2} * \frac{CornerGain}{32}$$

This produces the grid illustrated in FIG. 13C. Next, virtual sensors VS[1,1] to VS[4,1] are computed using adjacent sensors. By labeling VS[1,2] as AS[1,2], all four of these calculations can be expressed using the formula $$VS[i, 1] = AS[i, 2] * \frac{InnerEdgeGain}{128}$$

for i=1 to 4. This produces the grid illustrated in FIG. 13D. In some implementations, the next virtual sensors to compute are VS[1,0] to VS[4,0], using the formula $$VS[i, 0] = VS[i, 1] * \frac{OuterEdgeGain}{128}$$

to produce the grid shown in FIG. 13E.

Finally, the virtual sensors VS[0,0] to VS[0,4] are computed using the formula $$VS[0, i] = VS[1, i] * \frac{InnerEdgeGain}{128}$$

for i=0, 1, and 2

$$VS[0, i] = AS[1, i] * \frac{InnerEdgeGain}{128}$$

for i=3 and 4. This produces the grid shown in FIG. 13F.

FIGS. 14A-14F illustrate a process for calculating virtual sensor measurements at an inner corner of a non-rectangular array, in accordance with some implementations. FIG. 14A illustrates four different arrangements that have an inner corner sensor as the local maximum LM. Based on horizontal, vertical, and/or diagonal mirroring, each of the arrangements is equivalent to the first arrangement 1400, which is described in FIGS. 14B-14F.

FIG. 14B illustrates the starting point, with 10 virtual sensors not yet calculated. The first sensor to calculate is the virtual corner sensor VS[1,1], which in some implementations is computed as $$VS[1, 1] = \frac{AS[2, 1] + AS[1, 2]}{2} * \frac{InnerCornerGain}{32}$$

This produces the gird shown in FIG. 14C. If VS[1,1] is labeled as AS[1,1], The virtual sensors VS[1,0] to VS[4,0] can be computed as $$VS[i, 0] = AS[i, 1] * \frac{InnerEdgeGain}{128}$$

for i=1 to 4. This produces the grid shown in FIG. 14D. Next, the values for virtual sensors VS[0,1] to VS[0,4] are computed using the formula $$VS[0, i] = AS[1, i] * \frac{InnerEdgeGain}{128}$$

for i=1 to 4, where AS[1,1] is defined to be VS[1,1]. This produces the grid in FIG. 14E, with all sensors computed except the upper left corner 1410. In some implementations, this final virtual sensor VS[0,0] is computed using the formula $$VS[0, 0] = \frac{VS[1, 0] + VS[0, 1]}{2} * \frac{OuterCornerGain}{32}$$

This final calculation produces the grid shown in FIG. 14F.

As described in these figures, additional virtual sensors are computed using various formulas based on the actual sensors. Once the virtual sensors are computed, a centroid algorithm may be applied to determine a more precise location or orientation of the touch. Although the examples in FIGS. 9-14F use five distinct location types and six distinct adjustment parameters, one of skill in the art recognizes that many alternatives are possible in light of this disclosure.

Figure 15A:
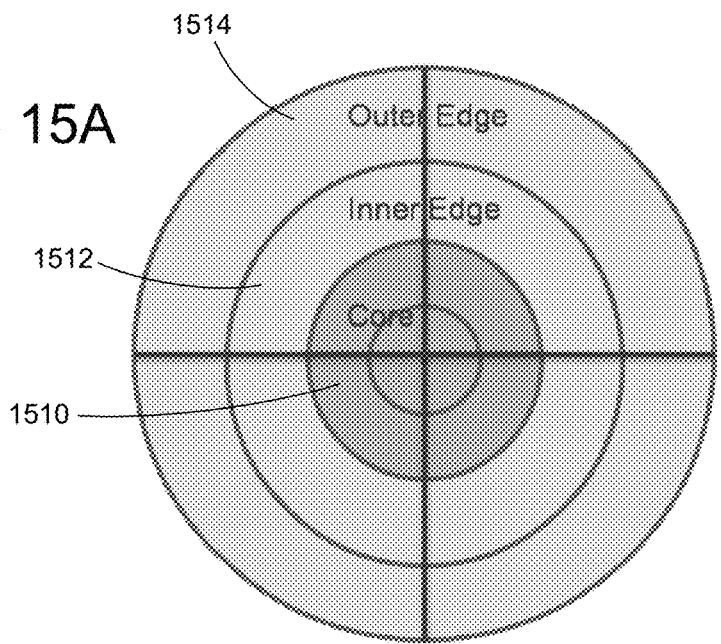
FIGS. 15A and 15B illustrate applying the disclosed techniques to sensors that are laid out in a circular pattern, in accordance with some implementations.

FIG. 15A illustrates a touch sensor array that is laid out as a series of concentric rings. Each ring includes a plurality of individual capacitive sensors. In some implementations, each of the individual sensors is the same size, so rings further from the center include more sensors. In some implementations, the areas of the sensors increase based on the distance from the center to that there is a one-to-one correspondence between sensors in one ring and sensors in an adjacent ring (e.g., a thin sector that emanates from the center has exactly one sensor in each ring). Unlike a rectangular array, there are no corners. However, the sensors at the edge of the array form an outer edge 1514, and the next ring of sensors forms an inner edge 1512. Closer to the center are the core sensors 1510.

Figure 15B:
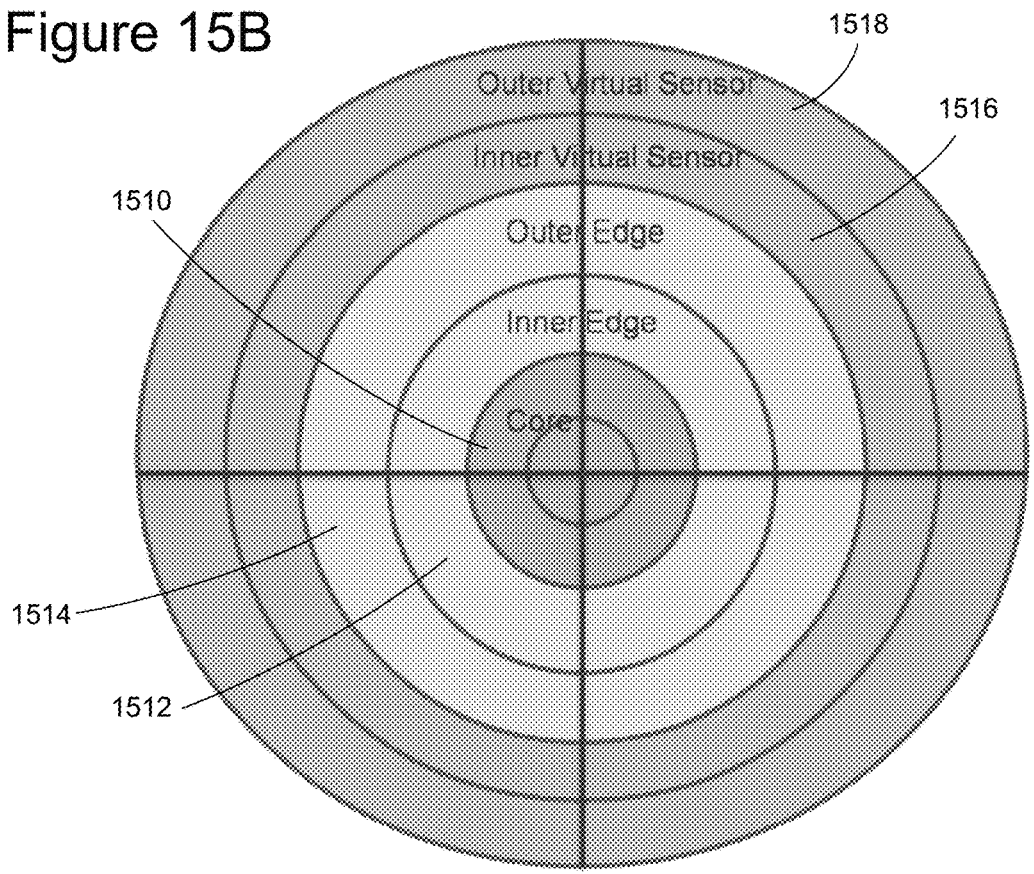

As illustrated in FIG. 15B, some implementations use two additional rings of virtual sensors, including an inner virtual sensor ring 1516 and an outer virtual sensor ring 1518. Depending on the location of a local maximum LM, implementations compute additional virtual sensor values in these additional rings. In some implementations, the calculation of virtual sensor values for the inner virtual sensor ring 1516 utilizes actual sensor values (one or more) in the outer edge 1514 together with an inner ring gain adjustment parameter. In some implementations, calculation of virtual sensor values for the outer virtual sensor ring 1518 utilizes virtual sensor values (one or more) in the inner virtual sensor ring 1516 together with an outer ring gain adjustment parameter.

In addition to adding virtual sensors, some implementations employ a compensation gain for actual sensors when the size of sensors gets smaller toward the center of a circular sensor (e.g., because the acquisition signal is smaller in the middle than in outer edge sensors).

The different mirroring based on the finger location can be applied to sensor arrays that are not organized in X/Y grid sensor patterns. For example, the disclosed techniques can be used for sliced ring patterns. The techniques can also be applied when the sensor pattern is a triangle. Some implementations also apply these techniques to trapezoid sensor patterns. In each case, the techniques perform calculations based on the finger location (e.g., relative to edges), applying different virtual sensor gains and different virtual sensor mirroring.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, as long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A touch sensing system, comprising:
   a two-dimensional capacitive sense array including a plurality of capacitive sensors, wherein each capacitive sensor in the capacitive sense array is associated with a unique location type;
   a capacitance measurement circuit coupled to the capacitive sense array and configured to measure capacitance changes at each capacitive sensor of the capacitive sense array;
   a memory device storing adjustment parameters, wherein each adjustment parameter corresponds to one or more of the location types;
   a processing unit coupled to the capacitance measurement circuit, wherein the processing unit is configured for:
      receiving measured capacitance changes corresponding to a touch on the capacitive sense array;
      identifying a first sensor whose measured capacitance change is a local maximum within the capacitive sense array;
      determining a first location type of the first sensor;
      in accordance with the first location type, the adjustment parameters, and the measured capacitance changes, computing a plurality of virtual sensor measurements including:
         calculating a value for a first virtual sensor adjacent to one of the plurality of capacitive sensors using a first adjustment parameter corresponding to the first location type; and
         calculating values for a plurality of virtual sensors based on the calculated value for the first virtual sensor and at least one adjustment parameter corresponding to locations of the virtual sensors; and
      computing a centroid of the touch using a plurality of the measured capacitance changes and the plurality of virtual sensor measurements.

2. The touch sensing system of claim 1, wherein the location types are core, inner edge, outer edge, outer corner, and inner corner.

3. The touch sensing system of claim 1, wherein the two-dimensional capacitive sense array is non-rectangular.

4. The touch sensing system of claim 1, wherein the adjustment parameters include a first adjustment parameter for inner edges, a second adjustment parameter for outer edges, a plurality of additional adjustment parameters for corners, a fourth adjustment parameter for an inner virtual sensor ring concentrically surrounding the two-dimensional capacitive sense array that is circular, and a fifth adjustment parameter for an outer virtual sensor ring concentrically surrounding the inner virtual sensor ring.

5. The touch sensing system of claim 4, wherein the plurality of additional adjustment parameters for corners include an inner corner adjustment parameter, an outer corner adjustment parameter, an edge corner adjustment parameter, and corner adjustment parameter.

6. A method of computing touch centroids for capacitive sense arrays, comprising:
at a touch sensing system, wherein the touch sensing system includes a two-dimensional capacitive sense array having a plurality of capacitive sensors and each capacitive sensor in the capacitive sense array is associated with a unique location type;
storing adjustment parameters, wherein each adjustment parameter corresponds to one or more of the location types;
measuring capacitance changes corresponding to a touch on the capacitive sense array;
identifying a first sensor whose measured capacitance change is a local maximum within the capacitance sense array;
determining a first location type of the first sensor;
in accordance with the first location type, the adjustment parameters and the measured capacitance changes, computing a plurality of virtual sensor measurements including:
calculating a value for a first virtual sensor adjacent to one of the plurality of capacitive sensors using a first adjustment parameter corresponding to the first location type; and
calculating values for a plurality of virtual sensors based on the calculated value for the first virtual sensor and at least one adjustment parameter corresponding to locations of the virtual sensors; and
computing a centroid of the touch using a plurality of the measured capacitance changes and the plurality of virtual sensor measurements.

7. The method of claim 6, wherein the location types are core, inner edge, outer edge, outer corner, and inner corner.

8. The method of claim 6, wherein the two-dimensional capacitive sense array is non-rectangular.

9. The method of claim 6, wherein the adjustment parameters include a first adjustment parameter for inner edges, a second adjustment parameter for outer edges, a plurality of additional adjustment parameters for corners, a fourth adjustment parameter for an inner virtual sensor ring concentrically surrounding the two-dimensional capacitive sense array that is circular, and a fifth adjustment parameter for an outer virtual sensor ring concentrically surrounding the inner virtual sensor ring.

10. The method of claim 9, wherein the plurality of additional adjustment parameters for corners include an inner corner adjustment parameter, an outer corner adjustment parameter, an edge corner adjustment parameter, and corner adjustment parameter.

11. A non-transitory computer readable storage medium, storing one or more programs configured for execution by one or more processors of a touch sensing system, wherein the touch sensing system includes a two-dimensional capacitive sense array having a plurality of capacitive sensors and each capacitive sensor in the capacitive sense array is associated with a unique location type, the one or more programs including instructions for:
storing adjustment parameters, wherein each adjustment parameter corresponds to one or more of the location types;
measuring capacitance changes corresponding to a touch on the capacitive sense array;
identifying a first sensor whose measured capacitance change is a local maximum within the capacitance sense array;
determining a first location type of the first sensor;
in accordance with the first location type, the adjustment parameters, and the measured capacitance changes, computing a plurality of virtual sensor measurements including:
calculating a value for a first virtual sensor adjacent to one of the plurality of capacitive sensors using a first adjustment parameter corresponding to the first location type; and
calculating values for a plurality of virtual sensors based on the calculated value for the first virtual sensor and at least one adjustment parameter corresponding to locations of the virtual sensors; and
computing a centroid of the touch using a plurality of the measured capacitance changes and the plurality of virtual sensor measurements.

12. The computer readable storage medium of claim 11, wherein the location types are core, inner edge, outer edge, outer corner, and inner corner.

13. The computer readable storage medium of claim 11, wherein the two-dimensional capacitive sense array is non-rectangular.

14. The computer readable storage medium of claim 11, wherein the adjustment parameters include a first adjustment parameter for inner edges, a second adjustment parameter for outer edges, a plurality of additional adjustment parameters for corners, a fourth adjustment parameter for an inner virtual sensor ring concentrically surrounding the two-dimensional capacitive sense array that is circular, and a fifth adjustment parameter for an outer virtual sensor ring concentrically surrounding the inner virtual sensor ring.

15. The computer readable storage medium of claim 14, wherein the plurality of additional adjustment parameters for corners include an inner corner adjustment parameter, an outer corner adjustment parameter, an edge corner adjustment parameter, and corner adjustment parameter.

* * * * *